United States Patent
Gu et al.

(10) Patent No.: US 9,824,120 B2
(45) Date of Patent: *Nov. 21, 2017

(54) METHOD AND SYSTEM FOR PRESENTING SEARCH RESULTS IN A PLURALITY OF TABS

(75) Inventors: Huaping Gu, Shanghai (CN); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,192

(22) Filed: Jan. 5, 2012

(65) Prior Publication Data

US 2012/0110017 A1 May 3, 2012

Related U.S. Application Data

(63) Continuation of application No. 12/061,946, filed on Apr. 3, 2008, now Pat. No. 8,112,431.

(51) Int. Cl.
*G06F 17/30* (2006.01)

(52) U.S. Cl.
CPC ............... *G06F 17/30448* (2013.01)

(58) Field of Classification Search
USPC ........................................................ 707/760
See application file for complete search history.

(56) References Cited

U.S. PATENT DOCUMENTS

| | | | |
|---|---|---|---|
| 5,168,565 A | 12/1992 | Morita | |
| 5,931,907 A * | 8/1999 | Davies | G06F 17/3071 707/999.01 |
| 6,491,217 B2 | 12/2002 | Catan | |
| 7,225,182 B2 | 5/2007 | Paine et al. | |
| 7,225,183 B2 | 5/2007 | Gardner | |
| 7,509,313 B2 * | 3/2009 | Colledge et al. | |
| 7,689,585 B2 * | 3/2010 | Zeng | G06F 17/30864 707/999.104 |
| 7,765,225 B2 * | 7/2010 | Robert | 707/765 |
| 7,783,624 B2 | 8/2010 | Martinez et al. | |
| 7,822,763 B2 * | 10/2010 | Sauls et al. | 707/766 |
| 8,112,431 B2 * | 2/2012 | Gu et al. | 707/760 |
| 2002/0139839 A1 | 10/2002 | Catan | |
| 2002/0161752 A1 * | 10/2002 | Hutchison | G06F 17/30873 |

(Continued)

OTHER PUBLICATIONS

"U.S. Appl. No. 12/061,946 Non-Final Office Action dated Sep. 20, 2010", 13 pgs.

(Continued)

*Primary Examiner* — Tyler Torgrimson
(74) *Attorney, Agent, or Firm* — Shook, Hardy & Bacon L.L.P.

(57) ABSTRACT

Systems and methods for providing search results in a plurality of tabs are described. In one example embodiment, a search term is received. In response, one or more keywords associated with the search term are obtained. Next, respective searches using respective keywords of the one or more keywords are performed to obtain respective results. The results are presented to a client machine for presentation. The presentation comprises a plurality of tabbed pages where each tabbed page of the plurality of tabbed pages including a respective keyword and a respective portion of the results corresponding to the respective keyword.

17 Claims, 14 Drawing Sheets

(56) References Cited

U.S. PATENT DOCUMENTS

| | | |
|---|---|---|
| 2004/0236736 A1* | 11/2004 | Whitman et al. ............... 707/3 |
| 2005/0125440 A1 | 6/2005 | Hirst |
| 2005/0267871 A1* | 12/2005 | Marchisio ......... G06F 17/30672 |
| 2006/0031215 A1* | 2/2006 | Pong Robert ....... G06F 17/3064 |
| 2006/0074856 A1 | 4/2006 | Liao et al. |
| 2007/0006134 A1 | 1/2007 | Larvet et al. |
| 2007/0112759 A1* | 5/2007 | Kulakow .......... G06F 17/30646 |
| 2007/0214158 A1* | 9/2007 | Kamen ............. G06F 17/30864 |
| 2008/0104032 A1 | 5/2008 | Sarkar |
| 2008/0109416 A1* | 5/2008 | Williams ......................... 707/3 |
| 2008/0208835 A1* | 8/2008 | Sauls et al. ...................... 707/5 |
| 2008/0294637 A1 | 11/2008 | Liu |
| 2009/0241058 A1 | 9/2009 | Costello et al. |
| 2009/0254536 A1* | 10/2009 | Gu et al. .......................... 707/5 |
| 2011/0066624 A1* | 3/2011 | Turakhia ........... G06F 17/30864 |
| | | 707/748 |

OTHER PUBLICATIONS

"U.S. Appl. No. 12/061,946, Final Office Action dated Mar. 3, 2011", 14 pgs.

"U.S. Appl. No. 12/061,946, Notice of Allowance dated Oct. 4, 2011", 12 pgs.

"U.S. Appl. No. 12/061,946, Response filed Apr. 25, 2011 to Final Office Action dated Mar. 3, 2011", 13 pgs.

"U.S. Appl. No. 12/061,946, Response filed Dec. 17, 2010 to Non Final Office Action dated Sep. 20, 2010", 14 pgs.

\* cited by examiner

METHOD AND SYSTEM FOR PRESENTING SEARCH RESULTS IN A PLURALITY OF TABS

RELATED APPLICATION

This application is a continuation of and claims the benefit of priority under 35 U.S.C. §120 to U.S. patent application Ser. No. 12/061,946, entitled "METHOD AND SYSTEM FOR PROCESSING SEARCH REQUESTS," filed on Apr. 3, 2008, which is hereby incorporated by reference herein in its entirety.

BACKGROUND

Users seeking to find information available on a publication system may perform on a search of data repositories of such a system. The results of the search may be based on not only the available information but also the quality of the user's search. A poor quality search may result in not receiving desired search result or receiving too many undesirable search results.

BRIEF DESCRIPTION OF THE DRAWINGS

Some embodiments are illustrated by way of example and not limitation in the figures of the accompanying drawings in which.

DETAILED DESCRIPTION

Example methods and systems for processing search requests are described. In the following description, for purposes of explanation, numerous specific details are set forth in order to provide a thorough understanding of example embodiments. It will be evident, however, to one skilled in the art that the present invention may be practiced without these specific details.

In an example embodiment, a term of a search request may be received. An identification of the term as a meta-keyword may be made. One or more linguistically transformed keywords associated with the meta-keyword may be obtained. A search may be run on at least one of the one or more linguistically transformed keywords to obtain a result In an example embodiment, a term of a search request may be received. An identification of the tem as a meta-keyword may be made. One or more keywords associated with the meta-keyword may be obtained. The one or more keywords may be provided for presentation. A keyword selection of the one or more keywords may be made. A search may be run on the keyword selection too obtain a result.

In an example embodiment, a plurality of terms of a search request may be received. An identification of a particular term of the plurality of terms as being a meta-keyword may be made. A determination of whether a remaining term of the plurality of terms is a linguistically transformed keyword of the meta-keyword may be made. A search on the linguistically transformed keyword may be run to obtain a result.

In an example embodiment, a term of a search request may be received. The term of the search request may be provided to a provider. One or more linguistically transformed keywords may be received. The one or more linguistically transformed keywords may be associated with the term. The one or more linguistically transformed keywords may be provided for presentation. A keyword selection of the one or more linguistically transformed keywords may be received. The keyword selection may be provided to the provider. A result of a search may be received from the provider responsive to the providing of the keyword selection.

Figure 1:
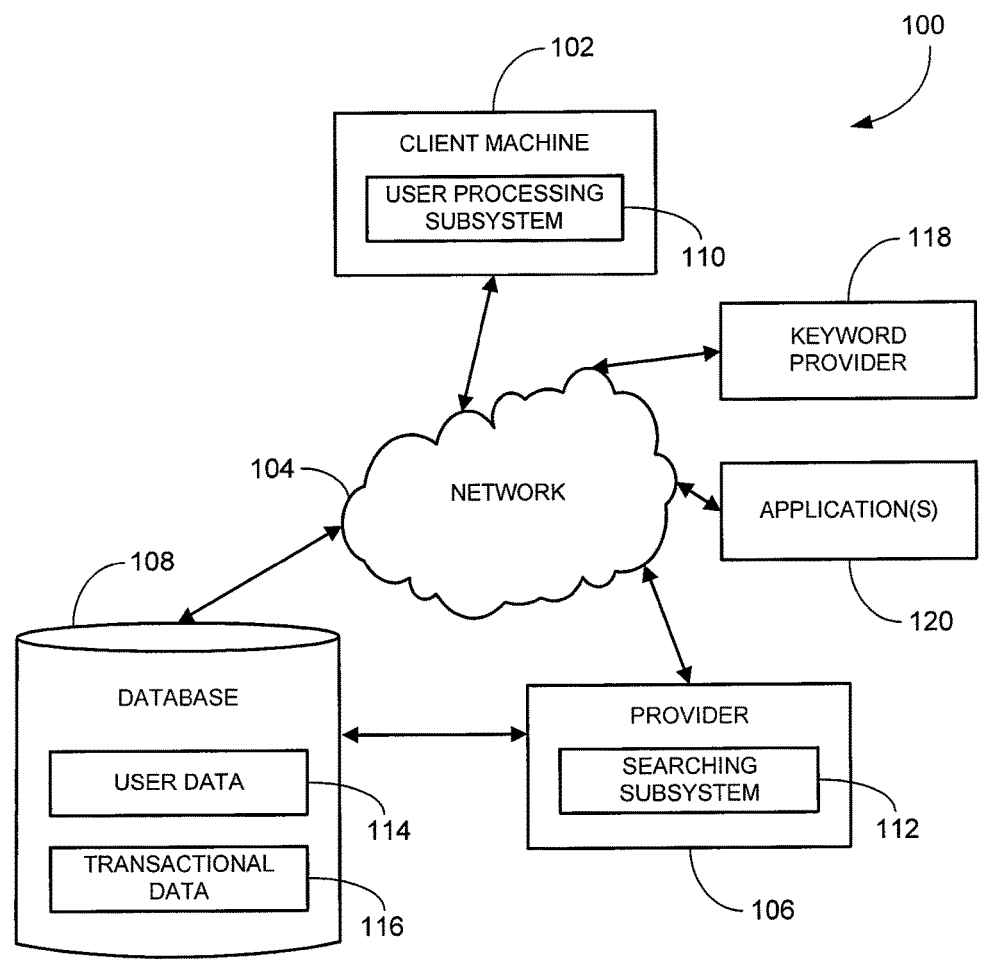
FIG. 1 is a block diagram of a system, according to example embodiments.

FIG. 1 illustrates an example system 100 in which a client machine 102 may be in communication with a provider 106 over a network 104. A user operating the client machine 102 may communicate with the provider 106 to conduct a search. Examples of the client machine 102 include a set-top box (STB), a receiver card, a mobile telephone, a personal digital assistant (PDA), a display device, a portable gaming unit, and a computing system; however other devices may also be used.

The network 104 over which the client machine 102 and the provider 106 are in communication may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

A user processing subsystem 110 may be deployed within the client machine 102 to enable a user of the client machine 102 to search using keywords.

The provider 106 may include a searching subsystem 112 to process search requests for one or more users. The provider 106 may also be in communication with a database 108. The database 108 may include user data 114 and/or transactional data 116. The user data 114 may include information regarding users of the provider. The transactional data 116 may include information regarding transactions conducted by the provider 106. For example, the sale of an item from one user to another may be stored in the transactional data 116.

A keyword provider 118 may be in communication with the client machine 102 over the network 104 to receive a term (e.g., a single word or multiple words) and identify whether the term is a meta-keyword. The meta-keyword may be, in an example embodiment, a word that has a "is-a" relationship with a term. An application may be in communication with the client machine 102 and/or the provider 106 to utilize search results.

Figure 2:
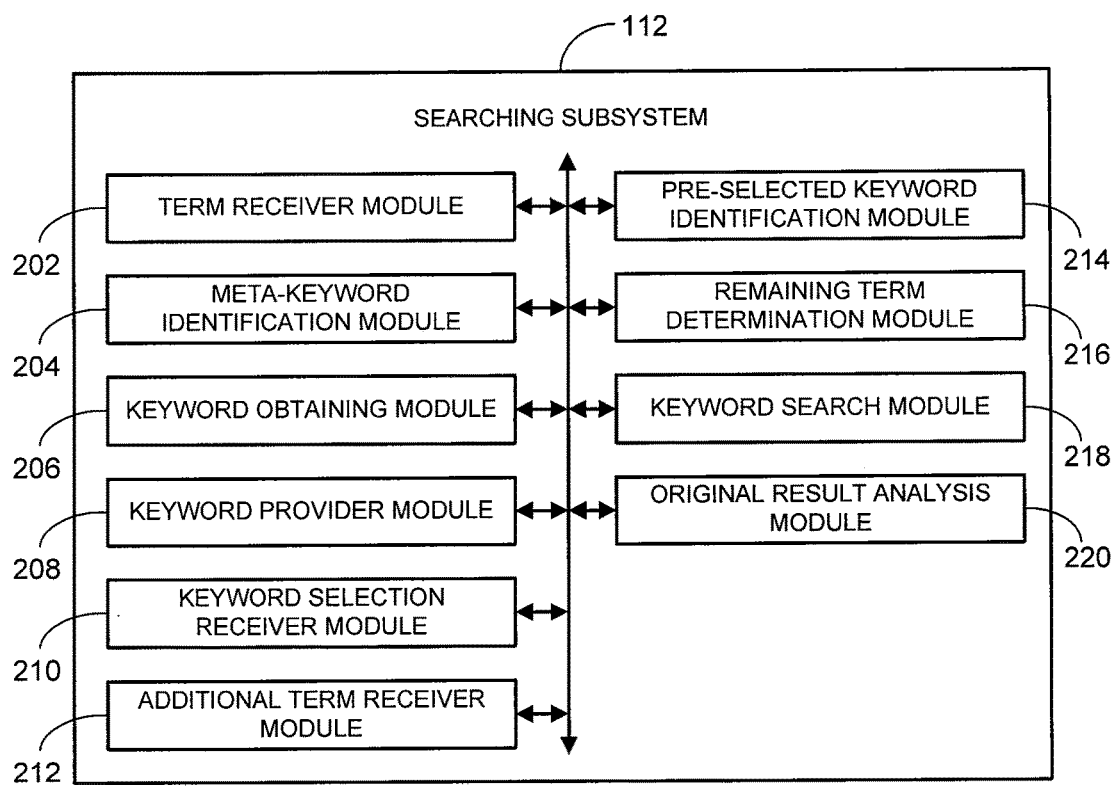
FIG. 2 is a block diagram of an example searching subsystem that may be deployed within the system of FIG. 1 according to an example embodiment.

FIG. 2 illustrates an example searching subsystem 112 that may be deployed in the provider 106 of the system 100 (see FIG. 1) or otherwise deployed in another system. The example searching subsystem 112 may include a term receiver module 202, a meta-keyword identification module 204, a keyword obtaining module 206, a keyword provider module 208, a keyword selection receiver module 210, an additional term receiver module 212, a pre-selected keyword identification module 214, a remaining term determination module 216, a keyword search module 218, and/or an initial result analysis module 220. Other modules may also be used.

The term receiver module 202 receives one or more terms of a search request. The meta-keyword identification module 204 identifies a term as a meta-keyword. The identification may include determining whether the term matches the meta-keyword on a list including a number of meta-keywords. The identification may include providing the term to the keyword provider 118 and receiving a meta-keyword response from the keyword provider 118. The identification may be otherwise performed.

The keyword obtaining module 206 obtains one or more keywords or one or more linguistically transformed keywords associated with the meta-keyword. The obtaining may include receiving the one or more linguistically transformed keywords and/or one or more keywords associated with the meta-keyword from the keyword provider 118. The obtaining may include accessing a number of prior user search patterns and analyzing the prior user search patterns to identify one or more linguistically transformed keywords and/or one or more keywords.

The keyword provider module 208 provides one or more keywords and/or one or more linguistically transformed keywords for presentation. The keyword selection receiver module 210 receives a keyword selection of one or more keywords and/or one or more linguistically transformed keywords.

The additional term receiver module 212 receives one or more additional terms. The pre-selected keyword identification module 214 identifies one or more pre-selected keywords among the linguistically transformed keywords and/or one or more pre-selected keywords among the keywords.

The remaining term determination module 216 determines whether a remaining term of a number of terms is a linguistically transformed keyword of a meta-keyword.

The keyword search module 218 runs an initial search on the term and/or a search on at least one of the one or more keywords, a keyword selection, a term, and/or one or more additional terms to obtain a result. The search may be run based on the keyword selection. The search may be run responsive to the identification of the one or more pre-selected keywords. The search may be run on the linguistically transformed keyword and one or more additional terms of the plurality of terms not including the meta-keyword. The initial result analysis module 220 analyzes the initial result of the running of the initial search.

A result of the running of the search and/or an initial result of the may be utilized. Utilizing the result may include providing the result of the running of the search to the application 120 or to a user for presentation. Utilizing the result may include providing the initial result of the running of the initial search to the application 120 or to a user for presentation. The result or the initial result may be otherwise utilized. The initial result may be provided simultaneously with one or more linguistically transformed keywords and/or the one or more keywords.

Figure 3:
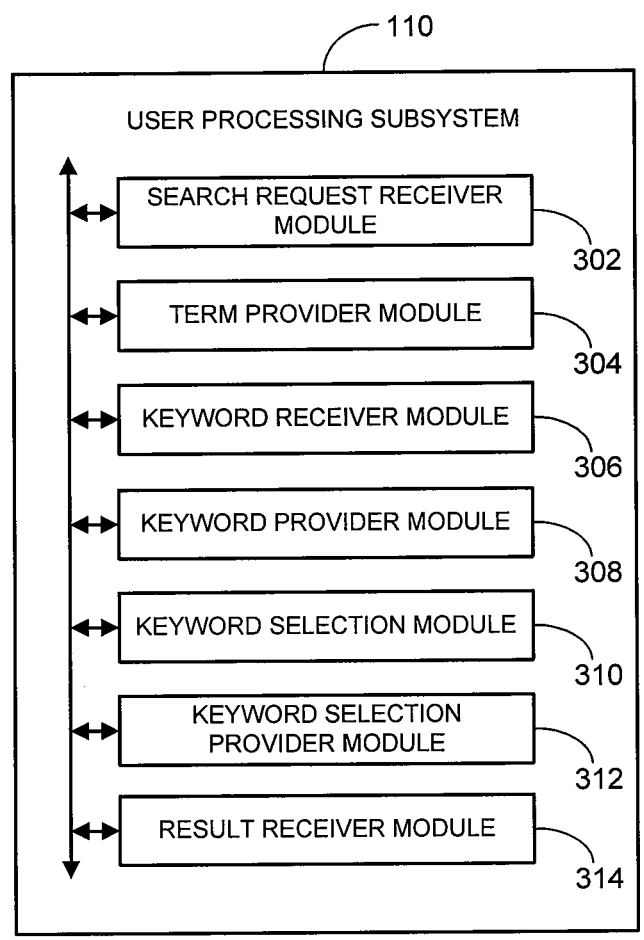
FIG. 3 is a block diagram of an example user processing subsystem that may be deployed within the system of FIG. 1 according to an example embodiment.

FIG. 3 illustrates an example user processing subsystem 110 that may be deployed in the client machine 102 of the system 100 (see FIG. 1) or otherwise deployed in another system. The example user processing subsystem 110 may include a search request receiver module 302, a term provider module 304, a keyword receiver module 306, a keyword provider module 308, a keyword selection module 310, a keyword selection provider module 312, and/or a result receiver module 314. Other modules may also be used.

The search request receiver module 302 receives a term of a search request. The term provider module 304 provides the term of the search request to the provider 106.

The keyword receiver module 306 receives one or more linguistically transformed keywords and/or one or more keywords. The one or more linguistically transformed keywords and/or the one or more keywords may bee associated with the term. The keyword provider module 308 provides the one or more linguistically transformed keywords and/or one or more keywords for presentation.

The keyword selection module 310 receives a keyword selection of the one or more linguistically transformed keywords and/or the one or more keywords. The keyword selection provider module 312 provides the keyword selection to the provider 106. The result receiver module 314 receives a result of a search from the provider 106 responsive to the providing of the keyword selection.

Figure 4:
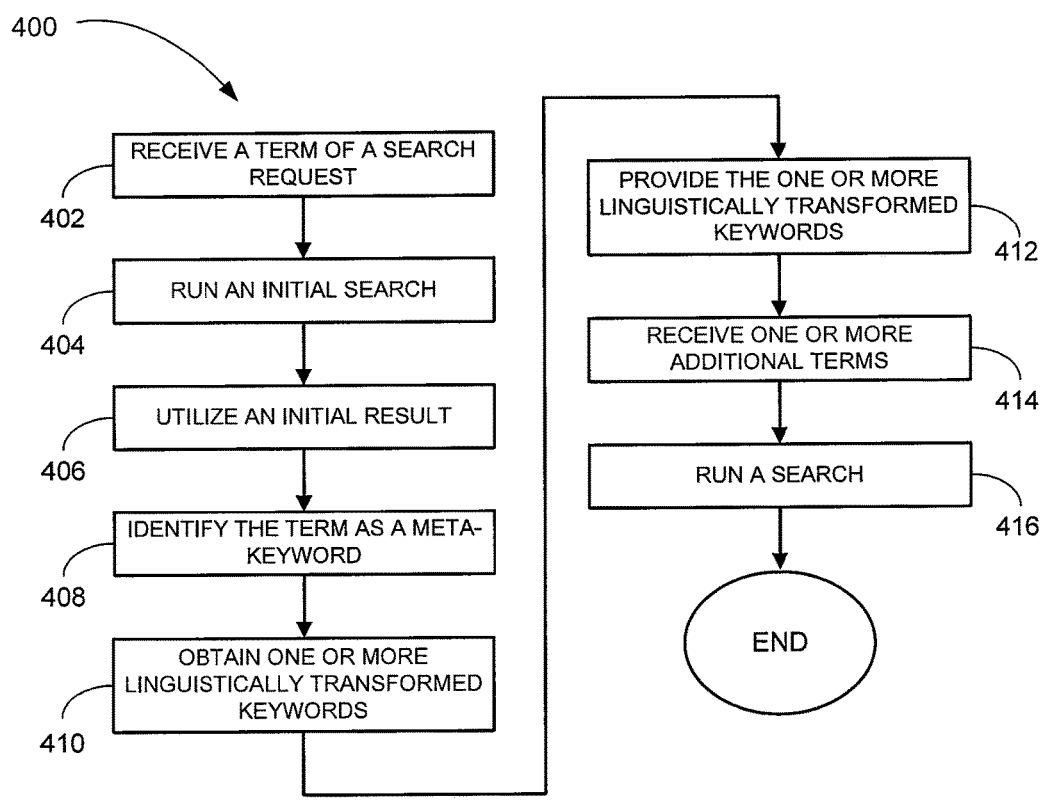
FIGS. 4-8 are example flowcharts illustrating a method for search request processing according to example embodiments.

FIG. 4 illustrates a method 400 for search request processing according to an example embodiment. The method 400 may be performed by the provider 106 of the system 100 (see FIG. 1) or otherwise performed.

A term of a search request is received at block 402. An initial search may be run on the term at block 404. The initial search may be a title search, a body search, or a different type of search.

An initial result of the running of the initial search may be utilized at block 406. The initial result of the running of the initial search may be provided for presentation, provided to the application 120, analyzed, or may be otherwise utilized.

An identification of the term as a meta-keyword is made at block 408. The identification may be based on the analyzing of the initial result. The identification may include determining whether the term matches the meta-keyword on a list including a number of meta-keywords. The identification may include providing the term to the keyword provider 118 and receiving a meta-keyword response from the keyword provider 118.

One or more linguistically transformed keywords associated with the meta-keyword are obtained at block 410. The obtaining may include receiving the one or more linguistically transformed keywords associated with the meta-keyword from the keyword provider 118. The obtaining may include accessing a number of prior user search patterns and analyzing the prior user search patterns (e.g., through a machine learning algorithm based upon user behavior of the user of the words for search) to identify the one or more linguistically transformed keywords, preselection of the linguistically transformed keywords by administrators, explicit and/or implicit feedback from users (e.g., using a tabbed page), or may be otherwise obtained.

The one or more linguistically transformed keywords may include one or more hyponym keywords, one or more hypernym keywords, one or more meronym keywords, one or more holonym keywords, one or more derived keywords, and/or one or more sounds-like keyword keywords. Other linguistically transformed keywords may also be used.

The one or more linguistically transformed keywords may be provided for presentation at block 412. The initial result may be provided for presentation simultaneously with the one or more linguistically transformed keywords.

One or more additional terms may be received at block 414. A search on at least one of the one or more linguistically transformed keywords, the term, and/or one or more additional terms is run to obtain a result at block 416. The search may be a title search, a body search, or a different type of search.

A result of the running of the search may be utilized. The utilization of the result may include providing the result to the application 120 and/or providing the result for presentation. By way of an example, the result may be provided in one or more tabbed pages. A tabbed page may include a particular linguistically transformed keyword of the one or more linguistically transformed keywords. The result may also be utilized in a different manner.

Figure 5:
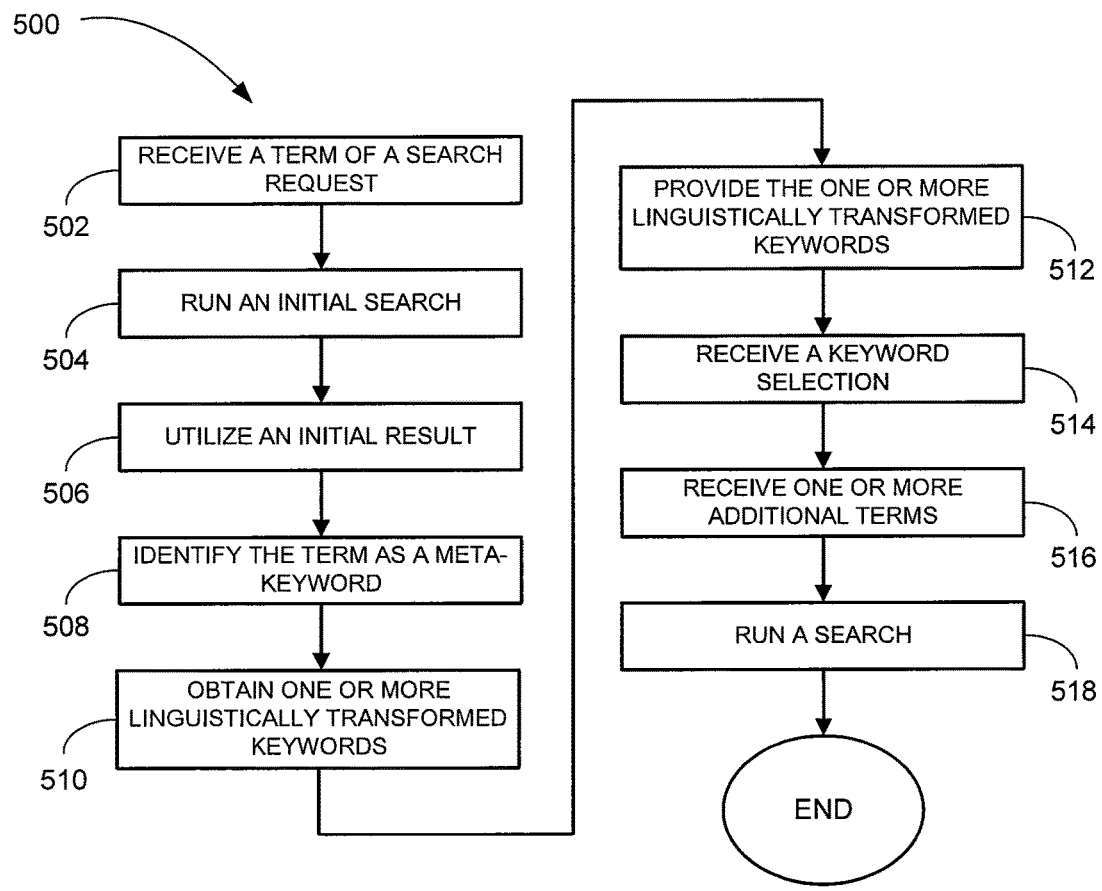

FIG. 5 illustrates a method 500 for search request processing according to an example embodiment. The method 500 may be performed by the provider 106 of the system 100 (see FIG. 1) or otherwise performed.

A term of a search request is received at block 502. An initial search may be run on the term at block 504. The initial search may be a title search, a body search, or a different type of search.

An initial result of the running of the initial search may be utilized at block 506. The initial result of the running of the initial search may be provided for presentation, provided to the application 120, analyzed, or may be otherwise utilized.

An identification of the term as a meta-keyword is made at block 508. The identification may be based on the analyzing of the initial result.

One or more linguistically transformed keywords associated with the meta-keyword are obtained at block 510. The obtaining may include receiving the one or more linguistically transformed keywords associated with the meta-keyword from the keyword provider 118. The obtaining may include accessing a number of prior user search patterns and analyzing the prior user search patterns (e.g., through a machine learning algorithm based upon user behavior of the user of the words for search) to identify the one or more linguistically transformed keywords, preselection of the linguistically transformed keywords by administrators, explicit and/or implicit feedback from users (e.g., using a tabbed page), or may be otherwise obtained.

The one or more linguistically transformed keywords are provided for presentation at block 512. The initial result may be provided for presentation simultaneously with the one or more linguistically transformed keywords.

A keyword selection is received from the one or more linguistically transformed keywords at block 514. One or more additional terms may be received at block 516.

A search on at least one of the keyword selection, the term, and/or one or more additional terms is run to obtain a result at block 518. The search may be a title search, a body search, or a different type of search.

A result of the running of the search may be utilized. The utilization of the result may include providing the result to the application 120 and/or providing the result for presentation. By way of an example, the result may be provided in one or more tabbed pages. A tabbed page may include a particular linguistically transformed keyword of the one or more linguistically transformed keywords. The result may also be utilized in a different manner.

Figure 6:
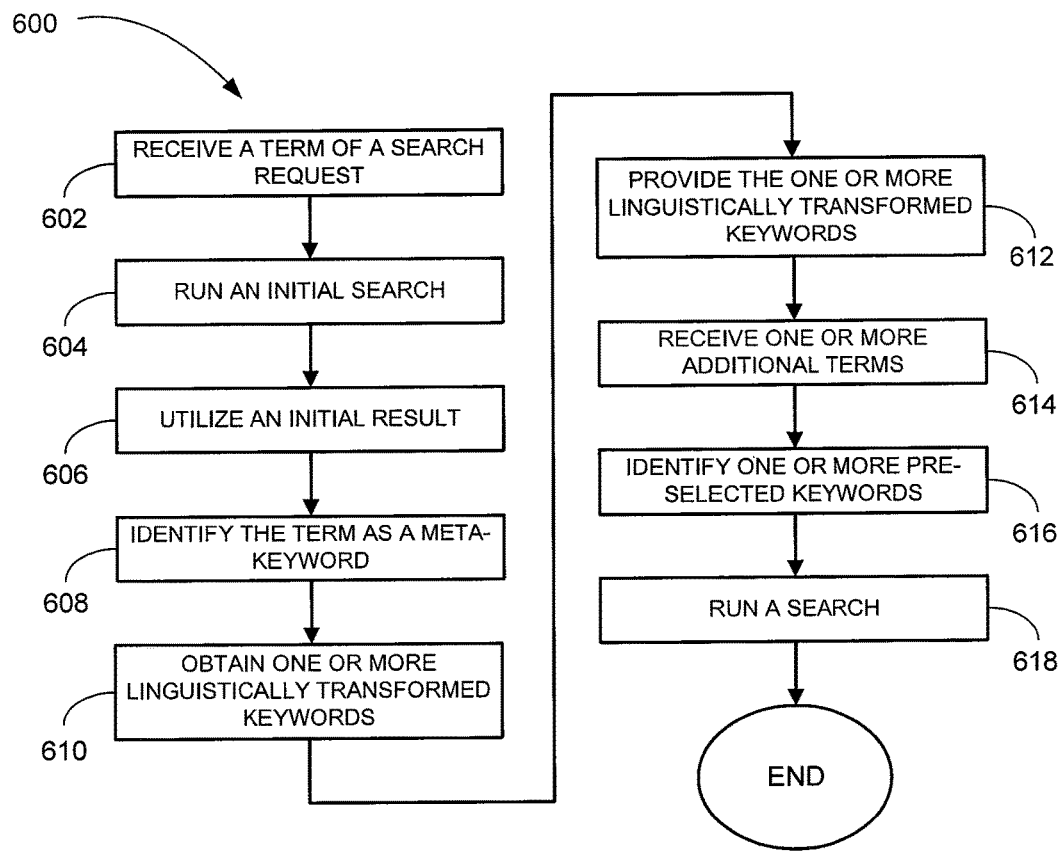

FIG. 6 illustrates a method 600 for search request processing according to an example embodiment. The method 600 may be performed by the provider 106 of the system 100 (see FIG. 1) or otherwise performed.

A term of a search request is received at block 602. An initial search may be run on the term at block 604. The initial search may be a title search, a body search, or a different type of search.

An initial result of the running of the initial search may be utilized at block 606. The initial result of the running of the initial search may be provided for presentation, provided to the application 120, analyzed, or may be otherwise utilized.

An identification of the term as a meta-keyword is made at block 608. The identification may be based on the analyzing of the initial result.

One or more linguistically transformed keywords associated with the meta-keyword are obtained at block 610. The obtaining may include receiving the one or more linguistically transformed keywords associated with the meta-keyword from the keyword provider 118. The obtaining may include accessing a number of prior user search patterns and analyzing the prior user search patterns (e.g., through a machine learning algorithm based upon user behavior of the user of the words for search) to identify the one or more linguistically transformed keywords, preselection of the linguistically transformed keywords by administrators, explicit and/or implicit feedback from users (e.g., using a tabbed page), or may be otherwise obtained.

The one or more linguistically transformed keywords may be provided for presentation at block 612. The initial result may be provided for presentation simultaneously with the one or more linguistically transformed keywords.

One or more additional terms may be received at block 614. One or more pre-selected keywords are identified among the linguistically transformed keywords at block 616. The pre-selected keywords may be pre-selection based on a promotion being run by the provider or may be otherwise pre-selected.

A search on at least one of the one or more pre-selected keywords, the term, and/or one or more additional terms is run to obtain a result at block 618. The search may be a title search, a body search, or a different type of search.

A result of the running of the search may be utilized. The utilization of the result may include providing the result to the application 120 and/or providing the result for presentation. By way of an example, the result may be provided in one or more tabbed pages. A tabbed page may include a particular linguistically transformed keyword of the one or more linguistically transformed keywords. The result may also be utilized in a different manner.

Figure 7:
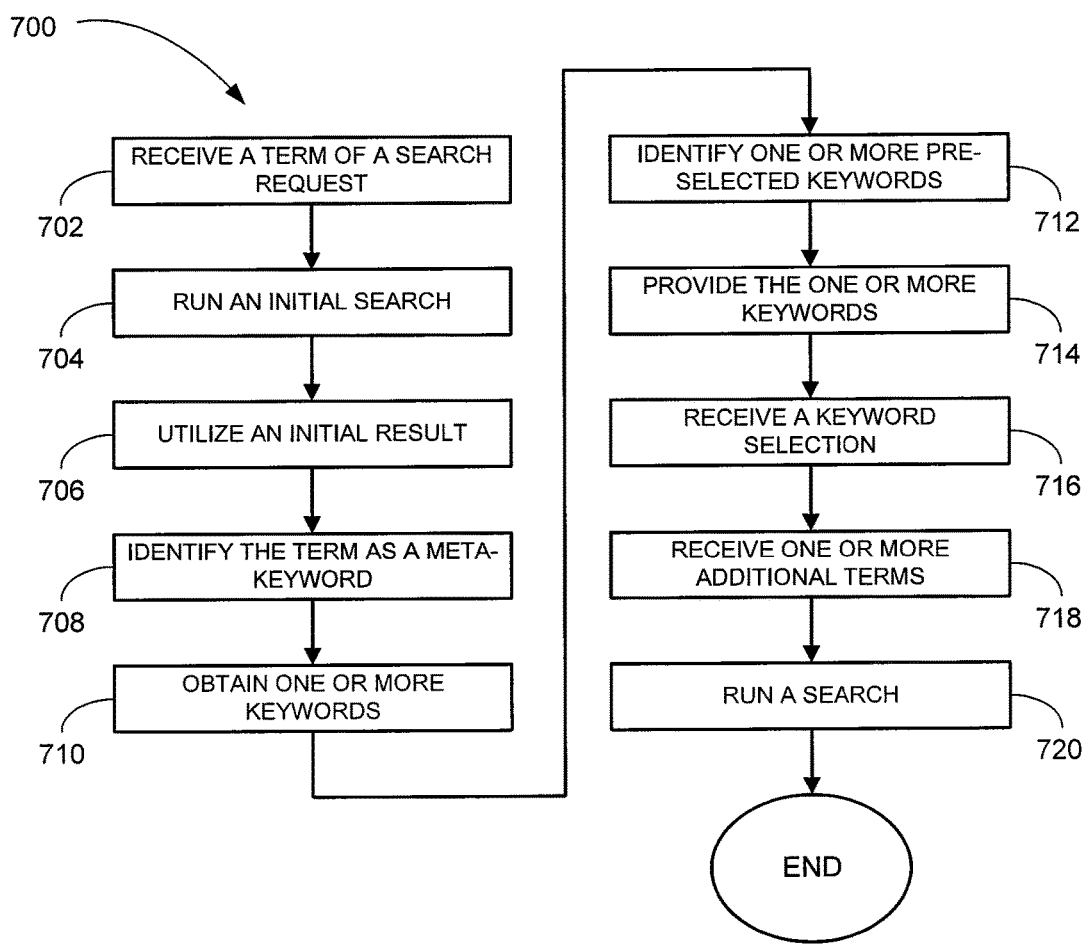

FIG. 7 illustrates a method 700 for search request processing according to an example embodiment. The method 700 may be performed by the provider 106 of the system 100 (see FIG. 1) or otherwise performed.

A term of a search request is received at block 702. An initial search may be run on the term at block 704.

An initial result of the running of the initial search may be utilized at block 706. The initial result of the running of the search may be provided to the application 120 and/or provided for presentation. The utilizing of the initial result may include analyzing the initial result of the running of the search.

An identification of the term as a meta-keyword is made at block 708. The identification may include determining whether the term matches the meta-keyword on a list including a number of meta-keywords. The identification may include providing the term to the keyword provider 118 and receiving a meta-keyword response from the keyword provider 118. The identification may be based on the analysis of the initial result.

One or more keywords associated with the meta-keyword are obtained at block 710. The obtaining may include receiving the one or more keywords associated with the meta-keyword from the keyword provider 118. The obtaining may include accessing a number of prior user search patterns and analyzing the prior user search patterns (e.g., through a machine learning algorithm based upon user behavior of the user of the words for search) to identify the one or more keywords, preselection of the keywords by administrators, explicit and/or implicit feedback from users (e.g., using a tabbed page), or may be otherwise obtained.

One or more pre-selected keywords may be identified among the keywords at block 712. The one or more keywords may be provided for presentation at block 714. The providing of the one or more keywords may be responsive to the identifying of the one or more pre-selected keywords. For example, the pre-selected keywords may be distinguished from the remaining keywords.

A keyword selection of the one or more keywords is received at block 716. One or more additional terms may be received at block 718.

A search is run on the keyword selection and/or the term to obtain a result at block 720. The running of the search may be based on the keyword selection and the receiving of the one or more additional terms. The search may be a title search, a body search, or a different type of search.

A result of the running of the search may be utilized. The utilization of the result may include providing the result of the running of the search for presentation and/or to the application 120.

Figure 8:
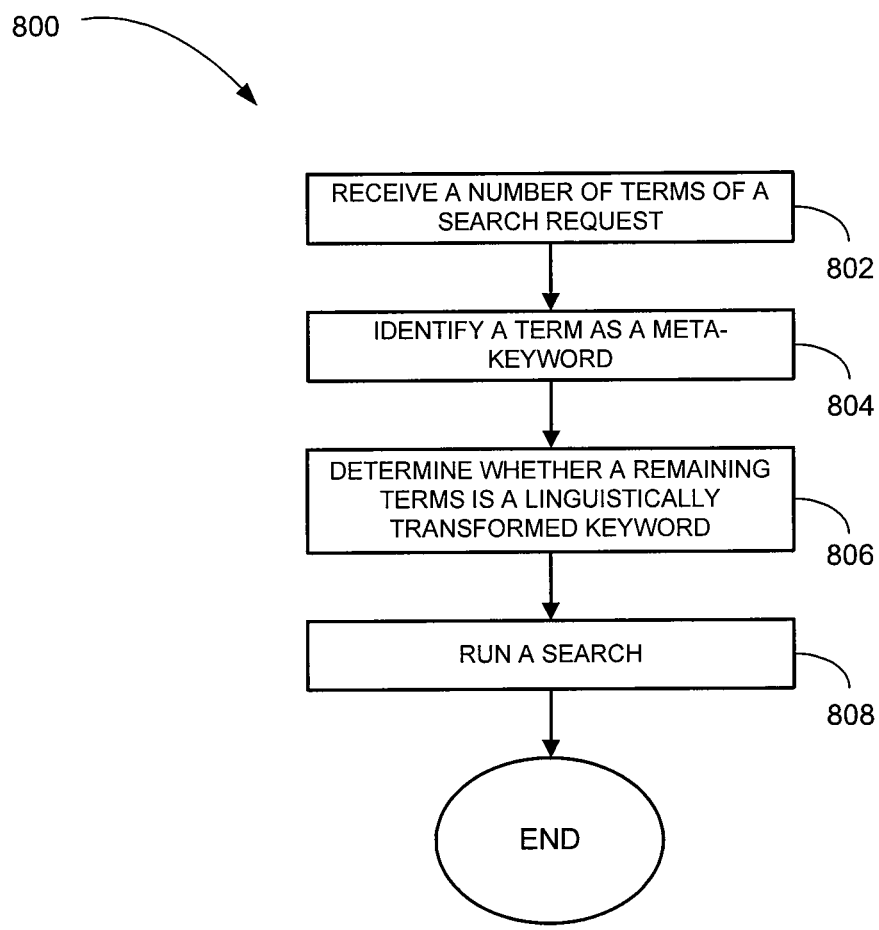

FIG. 8 illustrates a method 800 for search request processing according to an example embodiment. The method 800 may be performed by the provider 106 of the system 100 (see FIG. 1) or otherwise performed.

A number of terms of a search request are received at block 802. An identification of a particular term of the terms is a meta-keyword is made at block 804.

A determination of whether a remaining term of the terms is a linguistically transformed keyword of the meta-keyword is made at block 806.

A search is run on the linguistically transformed keyword is made to obtain a result at block 808. The search may be run on the linguistically transformed keyword and one or more additional terms of the terms. The additional terms may not include the meta-keyword. The result of the running of the search may be utilized.

Figure 9:
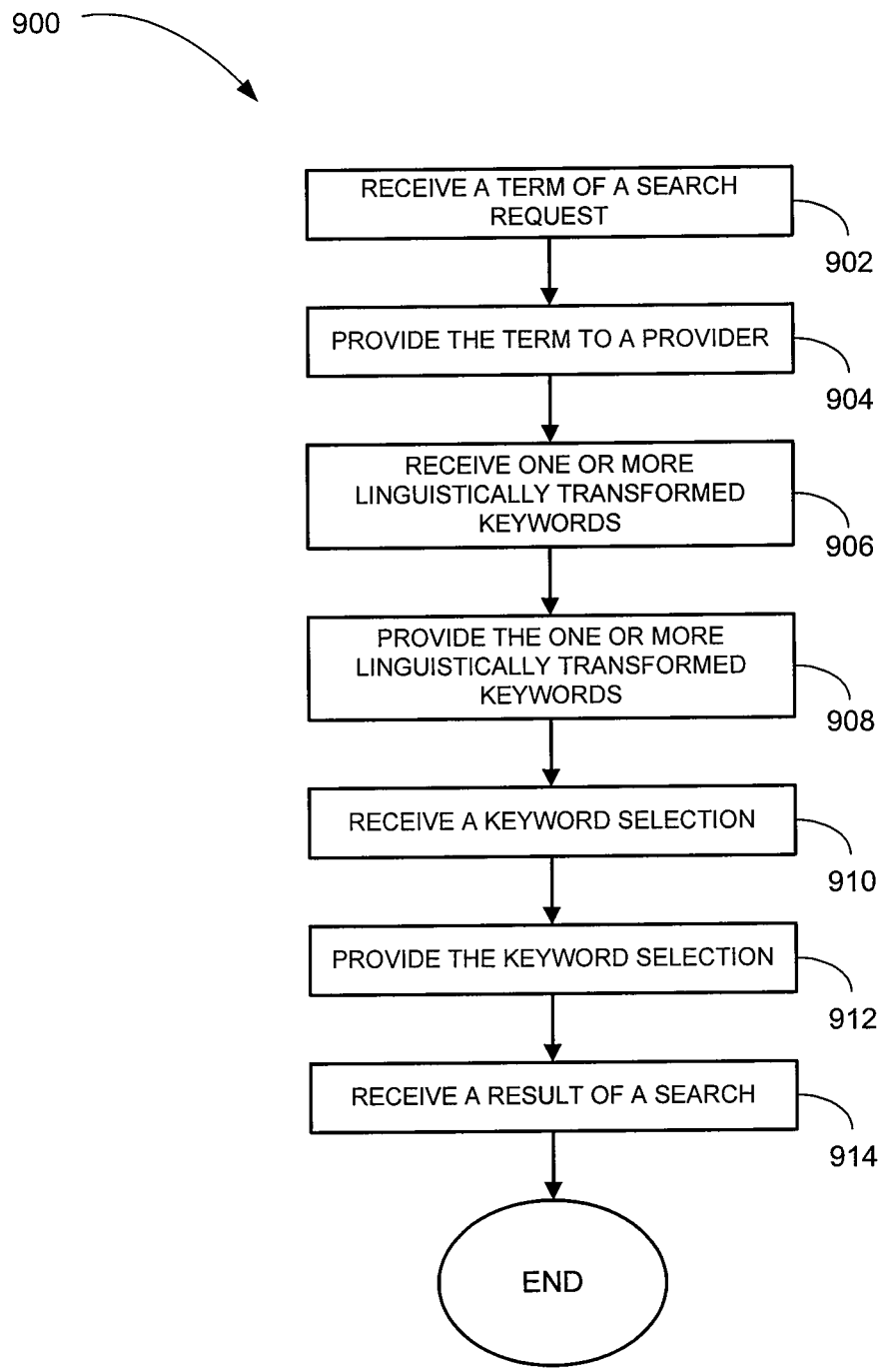
FIG. 9 is an example flowchart illustrating a method for keyword searching according to an example embodiment.

FIG. 9 illustrates a method 900 for keyword searching according to an example embodiment. The method 900 may be performed by the client machine 102 of the system 100 (see FIG. 1) or otherwise performed.

A term of a search request is received at block 902. The term of the search request is provided to the provider 106 or the keyword provider 118 at block 904.

One or more linguistically transformed keywords are received at block 906. The one or more linguistically transformed keywords may be associated with the term.

The one or more linguistically transformed keywords are provided for presentation at block 908. A keyword selection of the one or more linguistically transformed keywords is received at block 910.

The keyword selection is provided to the provider 106 at block 912. A result of a search from the provider 106 is received responsive to the providing of the keyword selection at block 914. While the method 900 is described as receiving and providing one or more linguistically transformed keywords, one or more keywords may alternatively be used.

Figure 10:
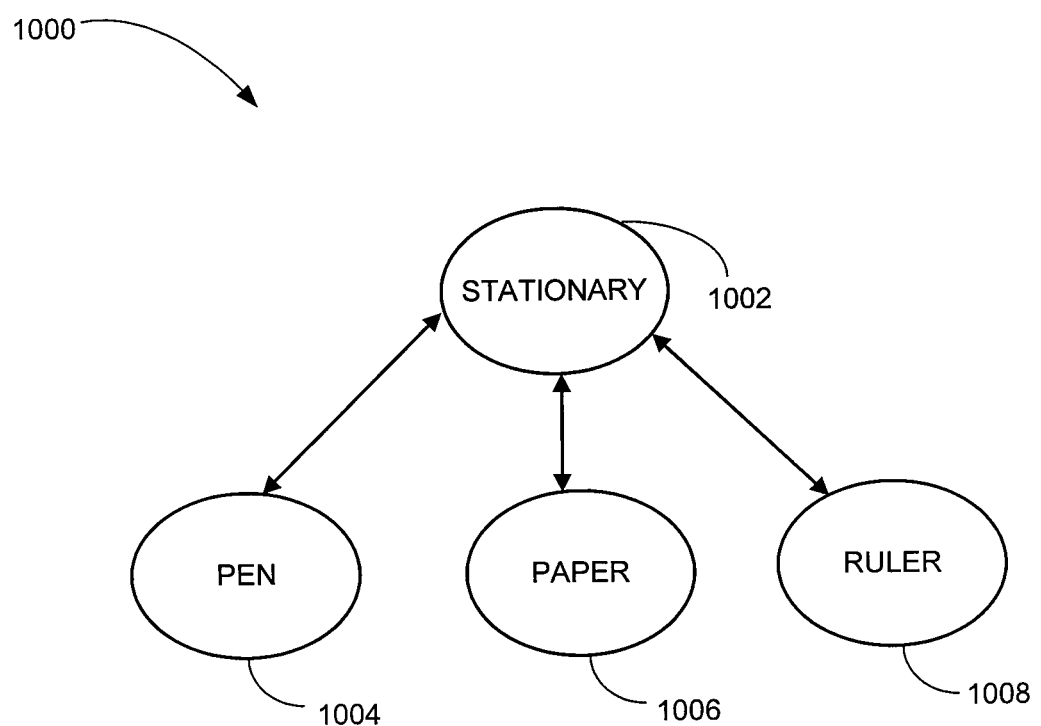
FIG. 10 is a block diagram of an example meta-keyword representation according to an example embodiment.

FIG. 10 is a block diagram of an example meta-keyword representation 1000 according to an example embodiment. Other meta-keywords in a similar or different arrangement may also be used.

The meta-keyword representation 1000 includes a meta-keyword 1002 associated with linguistically transformed keywords 1004-1008. The linguistically transformed keywords are shown as being hyponym keywords; however one or more different types of linguistically transformed keywords and/or non-linguistically transformed keywords may also be used.

Figure 11:
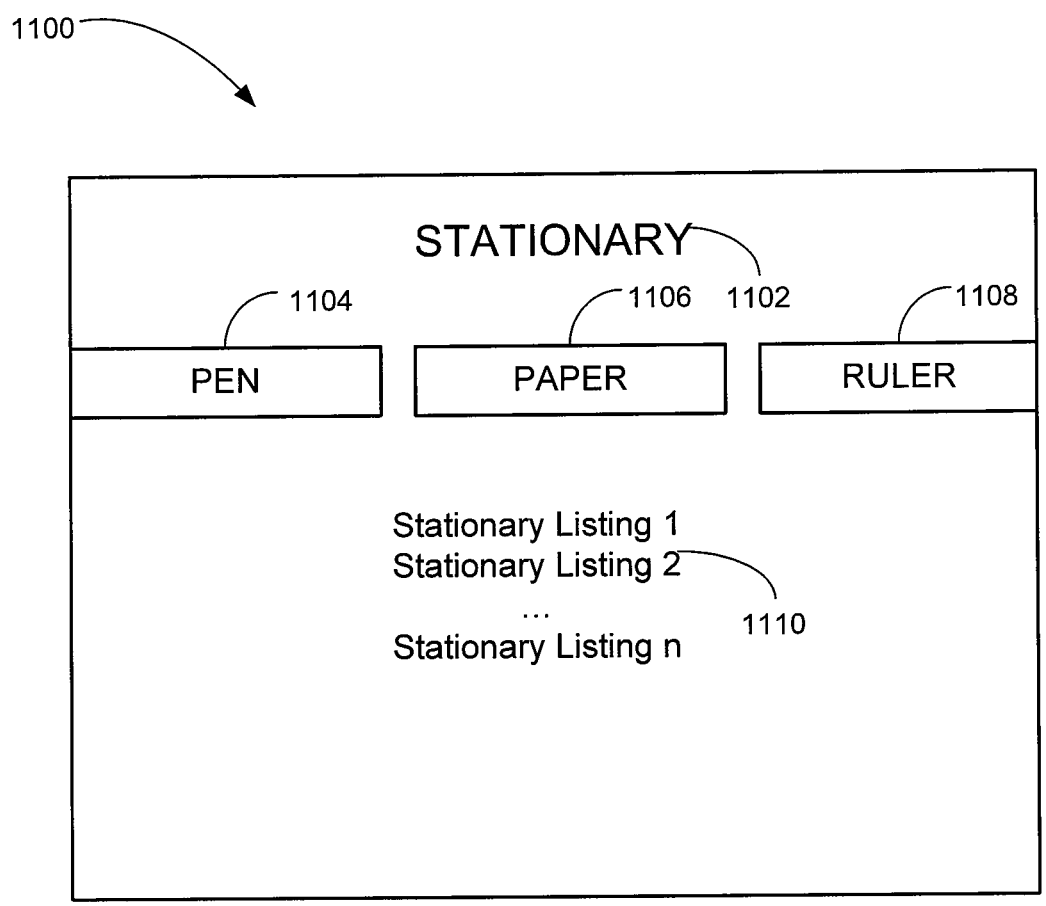
FIG. 11 is a block diagram of an example tabbed page according to an example embodiment.

FIG. 11 is a block diagram of an example tabbed page 1100 according to an example embodiment. Other representations including a group of a result may also be provided to a user for presentation.

The tabbed page 1100 includes a meta-keyword 1102 and a number of tabs 1104-1108 to enable selection of a keyword. By selecting one of the tabs 1104-1108, a user may be provided with the search results associated with the particular keyword selected. Thus, a result 1110 of the initial search on the meta-keyword 1102 may be replaced with a result of the search using the keyword.

Figure 12:
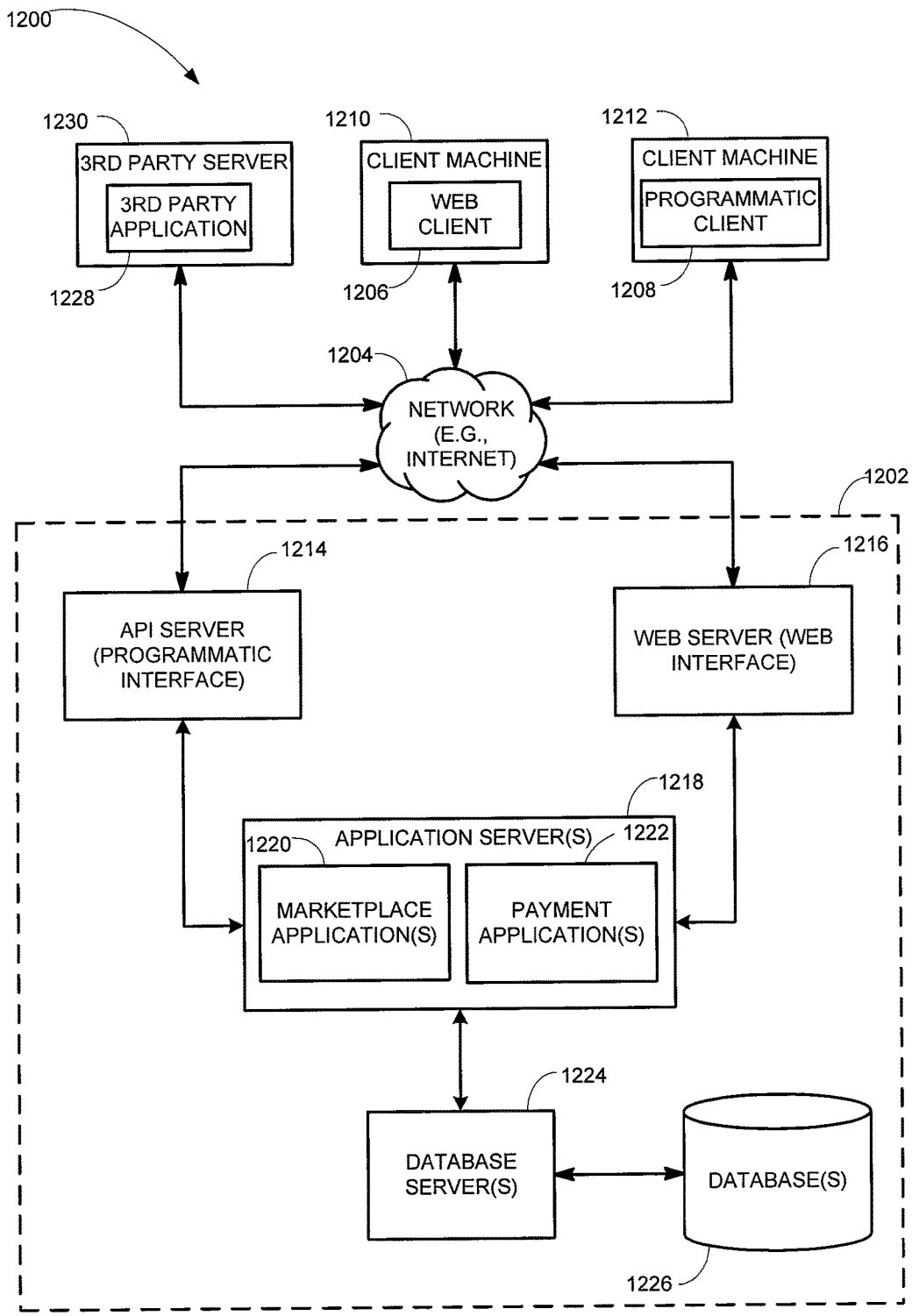
FIG. 12 is a network diagram depicting a network system, according to one embodiment, having a client server architecture configured for exchanging data over a network.

FIG. 12 is a network diagram depicting a client-server system 1200, within which one example embodiment may be deployed. By way of example, a network 1204 may include the functionality of the network 104, the provider 106 may be deployed within an application server 1218, and the client machine 102 may include the functionality of a client machine 1210 or a client machine 1212. The system 100 may also be deployed in other systems.

A networked system 1202, in the example forms of a network-based marketplace or publication system, provides server-side functionality, via a network 1204 (e.g., the Internet or Wide Area Network (WAN)) to one or more clients. FIG. 12 illustrates, for example, a web client 1206 (e.g., a browser, such as the Internet Explorer browser developed by Microsoft Corporation of Redmond, Wash. State), and a programmatic client 1208 executing on respective client machines 1210 and 1212.

An Application Program Interface (API) server 1214 and a web server 1216 are coupled to, and provide programmatic and web interfaces respectively to, one or more application servers 1218. The application servers 1218 host one or more marketplace applications 1220 and authentication providers 1222. The application servers 1218 are, in turn, shown to be coupled to one or more databases servers 1224 that facilitate access to one or more databases 1226.

The marketplace applications 1220 may provide a number of marketplace functions and services to users that access the networked system 1202. The authentication providers 1222 may likewise provide a number of payment services and functions to users. The authentication providers 1222 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1220. While the marketplace and authentication providers 1220 and 1222 are shown in FIG. 12 to both form part of the networked system 1202, in alternative embodiments the authentication providers 1222 may form part of a payment service that is separate and distinct from the networked system 1202.

Further, while the system 1200 shown in FIG. 12 employs a client-server architecture, the present invention is of course not limited to such an architecture, and could equally well find application in a distributed, or peer-to-peer, architecture system, for example. The various marketplace and authentication providers 1220 and 1222 could also be implemented as standalone software programs, which need not have networking capabilities.

The web client 1206 accesses the various marketplace and authentication providers 1220 and 1222 via the web interface supported by the web server 1216. Similarly, the programmatic client 1208 accesses the various services and functions provided by the marketplace and authentication providers 1220 and 1222 via the programmatic interface provided by the API server 1214. The programmatic client 1208 may, for example, be a seller application (e.g., the TurboLister™ application developed by eBay Inc., of San Jose, Calif.) to enable sellers to author and manage listings on the networked system 1202 in an off-line manner, and to perform batch-mode communications between the programmatic client 1208 and the networked system 1202.

FIG. 12 also illustrates a third party application 1228, executing on a third party server machine 1230, as having programmatic access to the networked system 1202 via the programmatic interface provided by the API server 1214. For example, the third party application 1228 may, utilizing information retrieved from the networked system 1202, support one or more features or functions on a website hosted by the third party. The third party may, for example, provide one or more promotional, marketplace or payment functions that are supported by the relevant applications of the networked system 1202.

Figure 13:
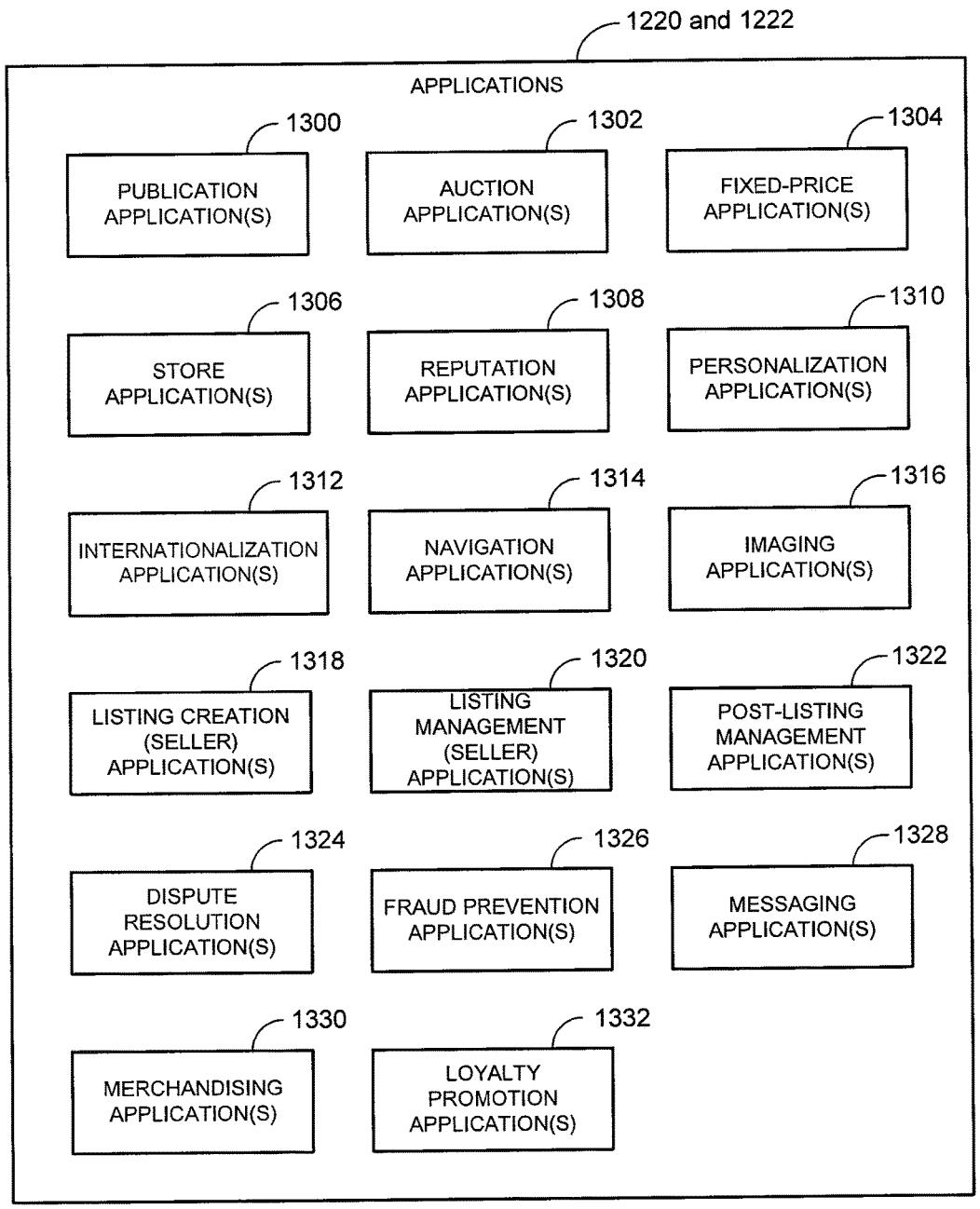
FIG. 13 is a block diagram illustrating an example embodiment of multiple network and marketplace applications, which are provided as part of the network-based marketplace.

FIG. 13 is a block diagram illustrating multiple applications 1220 and 1222 that, in one example embodiment, are provided as part of the networked system 1202 (see FIG. 12). The applications 1220 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1226 via the database servers 1224.

The networked system 1202 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1220 are shown to include at least one publication application 1300 and one or more auction applications 1302 which support auction-format listing and price setting mechanisms (e.g., English, Dutch, Vickrey, Chinese, Double, Reverse auctions etc.). The various auction applications 1302 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1304 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1306 allow a seller to group listings within a "virtual" store, which may be branded and otherwise personalized by and for the seller. Such a virtual store may also offer promotions, incentives and features that are specific and personalized to a relevant seller.

Reputation applications 1308 allow users that transact, utilizing the networked system 1202, to establish, build and maintain reputations, which may be made available and published to potential trading partners. Consider that where, for example, the networked system 1202 supports person-to-person trading, users may otherwise have no history or other reference information whereby the trustworthiness and credibility of potential trading partners may be assessed. The reputation applications 1308 allow a user, for example through feedback provided by other transaction partners, to establish a reputation within the networked system 1202 over time. Other potential trading partners may then reference such a reputation for the purposes of assessing credibility and trustworthiness.

Personalization applications 1310 allow users of the networked system 1202 to personalize various aspects of their interactions with the networked system 1202. For example a user may, utilizing an appropriate personalization application 1310, create a personalized reference page at which information regarding transactions to which the user is (or has been) a party may be viewed. Further, a personalization application 1310 may enable a user to personalize listings and other aspects of their interactions with the networked system 1202 and other parties.

The networked system 1202 may support a number of marketplaces that are customized, for example, for specific geographic regions. A version of the networked system 1202 may be customized for the United Kingdom, whereas another version of the networked system 1202 may be customized for the United States. Each of these versions may operate as an independent marketplace, or may be customized (or internationalized and/or localized) presentations of a common underlying marketplace. The networked system 1202 may accordingly include a number of internationalization applications 1312 that customize information (and/or the presentation of information) by the networked system 1202 according to predetermined criteria (e.g., geographic, demographic or marketplace criteria). For example, the internationalization applications 1312 may be used to support the customization of information for a number of regional websites that are operated by the networked system 1202 and that are accessible via respective web servers 1216.

Navigation of the networked system 1202 may be facilitated by one or more navigation applications 1314. For example, a search application (as an example of a navigation application) may enable key word searches of listings published via the networked system 1202. A browse application may allow users to browse various category, catalogue, or system inventory structures according to which listings may be classified within the networked system 1202. Various other navigation applications may be provided to supplement the search and browsing applications. In an example embodiment, the user processing subsystem 110 and/or the searching subsystem 112 (see FIG. 1) may include the functionality of the navigation applications 1314.

In order to make listings available via the networked system 1202 as visually informing and attractive as possible, the marketplace applications 1220 may include one or more imaging applications 1316 utilizing which users may upload images for inclusion within listings. An imaging application 1316 also operates to incorporate images within viewed listings. The imaging applications 1316 may also support one or more promotional features, such as image galleries that are presented to potential buyers. For example, sellers may pay an additional fee to have an image included within a gallery of images for promoted items.

Listing creation applications 1318 allow sellers conveniently to author listings pertaining to goods or services that they wish to transact via the networked system 1202, and listing management applications 1320 allow sellers to manage such listings. Specifically, where a particular seller has authored and/or published a large number of listings, the management of such listings may present a challenge. The listing management applications 1320 provide a number of features (e.g., auto-relisting, inventory level monitors, etc.) to assist the seller in managing such listings. One or more post-listing management applications 1322 also assist sellers with a number of activities that typically occur post-listing. For example, upon completion of an auction facilitated by one or more auction applications 1202, a seller may wish to leave feedback regarding a particular buyer. To this end, a post-listing management application 1322 may provide an interface to one or more reputation applications 1308, so as to allow the seller conveniently to provide feedback regarding multiple buyers to the reputation applications 1308.

Dispute resolution applications 1314 provide mechanisms whereby disputes arising between transacting parties may be resolved. For example, the dispute resolution applications 1314 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1326 implement fraud detection and prevention mechanisms to reduce the occurrence of fraud within the networked system 1202.

Messaging applications 1328 are responsible for the generation and delivery of messages to users of the networked system 1202, such messages for example advising users regarding the status of listings at the networked system 1202 (e.g., providing "outbid" notices to bidders during an auction process or to provide promotional and merchandising information to users). Respective messaging applications 1328 may utilize any one have a number of message delivery networks and platforms to deliver messages to users. For example, messaging applications 1328 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1330 support various merchandising functions that are made available to sellers to enable sellers to increase sales via the networked system 1202. The merchandising applications 1330 also operate the various merchandising features that may be invoked by sellers, and may monitor and track the success of merchandising strategies employed by sellers.

The networked system 1202 itself, or one or more parties that transact via the networked system 1202, may operate loyalty programs that are supported by one or more loyalty/promotions applications 1332. For example, a buyer may earn loyalty or promotions points for each transaction established and/or concluded with a particular seller, and may be offered a reward for which accumulated loyalty points can be redeemed.

Figure 14:
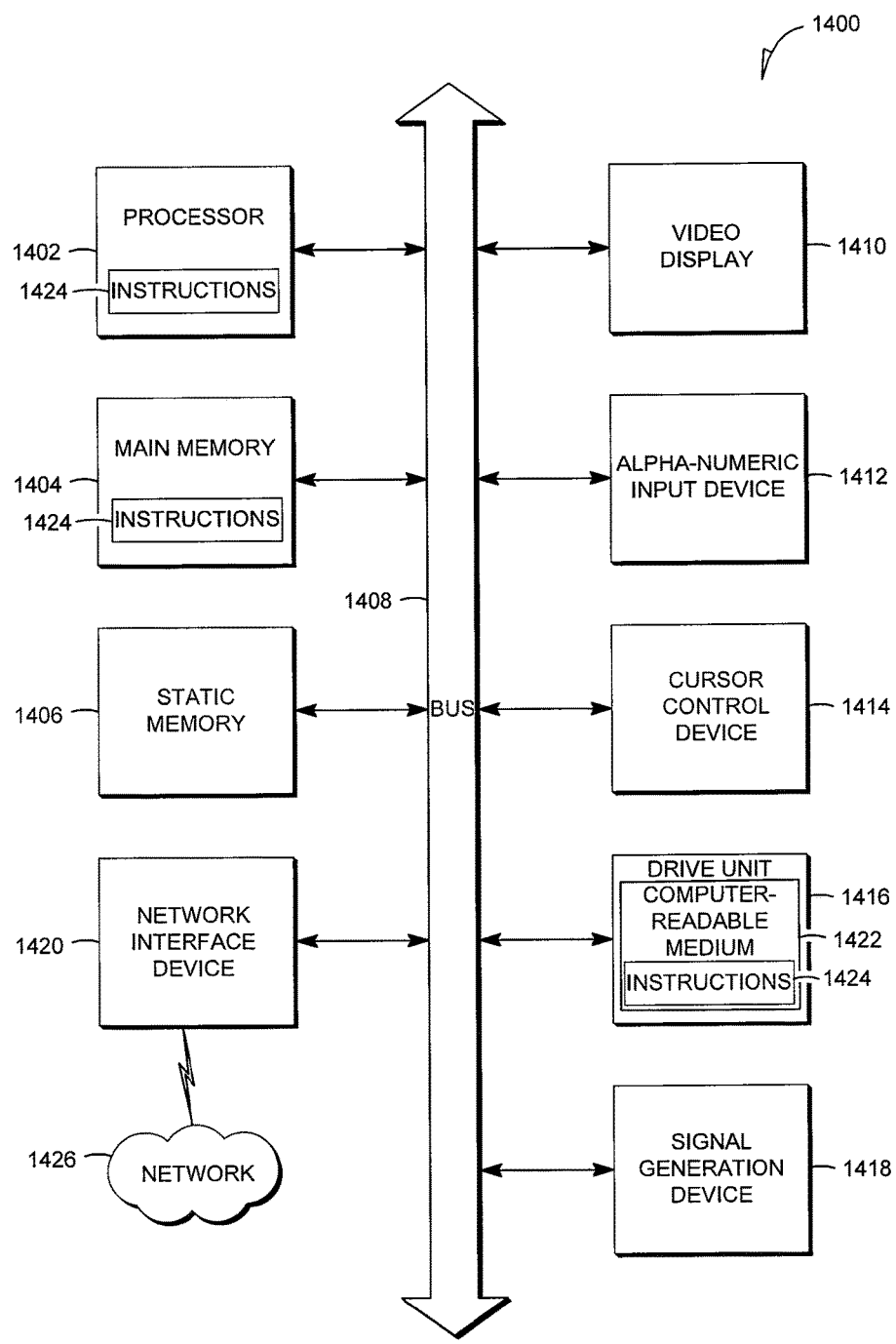
FIG. 14 is a block diagram diagrammatic representation of machine in the example form of a computer system within which a set of instructions for causing the machine to perform any one or more of the methodologies discussed herein may be executed.

FIG. 14 shows a diagrammatic representation of machine in the example form of a computer system 1400 within which a set of instructions may be executed causing the machine to perform any one or more of the methods, processes, operations, or methodologies discussed herein. The provider 106 may operate on or more computer systems 1400. The client machine 102 may include the functionality of one or more computer systems 1400.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU) a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a drive unit 1416, a signal generation device 1418 (e.g., a speaker) and a network interface device 1420.

The drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for processing search requests have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving a search term from a client machine of a user;
    identifying, by a keyword provider, a meta-keyword corresponding to the search term, the meta-keyword having an "is-a" relationship with one or more words;
    accessing one or more keywords provided by the keyword provider;
    performing a search of the one or more keywords provided by the keyword provider, the performing of the search of the one or more keywords being based on the meta-keyword, the performing of the search of the one or more keywords resulting in an identification of one or more linguistically transformed keywords associated with the meta-keyword among the one or more keywords provided by the keyword provider;
    performing an initial search of a data repository based on the search term received from the client machine of the user to obtain initial search results;
    performing one or more additional searches of the data repository based on the one or more linguistically transformed keywords to obtain keyword search results; and
    providing the initial search results and the keyword search results to the client machine for simultaneous presentation in a user interface of the client machine, the presentation comprising one or more tabbed pages, each tabbed page of the one or more tabbed pages including at least a portion of the initial search results, a linguistically transformed keyword of the one or more linguistically transformed keywords identified by the key word provider, and at least a portion of the keyword search results corresponding to a search performed based on the linguistically transformed keyword of the one or more linguistically transformed keywords.

2. The method of claim 1, further comprising, in response to receiving a selection of a tabbed page, displaying the respective portion of the keyword search results corresponding to a search performed based on a respective linguistically transformed keyword included in the tabbed page.

3. The method of claim 1, wherein the one or more additional searches of the data repository based on the one or more linguistically transformed keywords comprise a title search or a body search.

4. The method of claim 1, wherein the presentation comprises a display of the meta-keyword.

5. The method of claim 1, further comprising collecting feedback about the one or more linguistically transformed keywords based on particular tabbed pages selected by the user.

6. The method of claim 1, wherein the search term includes one or more search terms, wherein one of the one or more search terms is the meta-keyword.

7. A system comprising:
    a non-transitory machine-readable medium to store a data repository;
    one or more hardware processors including one or more modules configured to perform operations comprising:
    receiving a search term from a client machine of a user;
    identifying, by a keyword provider, a meta-keyword corresponding to the search term, the meta-keyword having an "is-a" relationship with one or more words;
    accessing one or more keywords provided by the keyword provider;
    performing a search of the one or more keywords provided by the keyword provider, the performing of the search of the one or more keywords being based on the meta-keyword, the performing of the search of the one or more keywords resulting in an identification of one or more linguistically transformed keywords associated with the meta-keyword among the one or more keywords provided by the keyword provider;
    performing an initial search of a data repository based on the search term received from the client machine of the user to obtain initial search results;
    performing one or more additional searches of the data repository based on the one or more linguistically transformed keywords to obtain keyword search results; and
    providing the initial search results and the keyword search results to the client machine for simultaneous presentation in a user interface of the client machine, the presentation comprising one or more tabbed pages, each tabbed page of the one or more tabbed pages including at leak a portion of the initial search results, a linguistically transformed keyword of the one or more linguistically transformed keywords identified by the key word provider, and at least a portion of the keyword search results corresponding to a search performed based on the linguistically transformed keyword of the one or more linguistically transformed keywords.

8. The system of claim 7, wherein the operations further comprise displaying, in response to receiving a selection of a tabbed page, a respective portion of the keyword search results corresponding to a search performed based on a respective linguistically transformed keyword included in the tabbed page.

9. The system of claim 7, wherein the one or more additional searches of the data repository based on the one or more linguistically transformed keywords comprise a title search or a body search.

10. The system of claim 7, wherein the presentation comprises a display of the meta-keyword.

11. The system of claim 7, wherein the operations further comprise collecting feedback about the one or more linguistically transformed keywords based on particular tabbed pages selected by the user.

12. The system of claim 7, wherein the search term includes one or more search terms, wherein one of the one or more search terms is the meta-keyword.

13. A non-transitory machine-readable medium storing instructions that when executed by one or more hardware processors, cause the one or more hardware processors to perform operations comprising:
  receiving a search term from a client machine of a user;
  identifying, by a keyword provider, a meta-keyword corresponding to the search term, the meta-keyword having an "is-a" relationship with one or more words;
  accessing one or more keywords provided by the keyword provider;
  performing a search of the one or more keywords provided by the keyword provider, the performing of the search of the one or more keywords being based on the meta-keyword, the performing of the search of the one or more keywords resulting in an identification of one or more linguistically transformed keywords associated with the meta-keyword among the one or more keywords provided by the keyword provider;
  performing an initial search of a data repository based on the search term received from the client machine of the user to obtain initial search results;
  performing one or more additional searches of the data repository based on the one or more linguistically transformed keywords to obtain keyword search results; and
  providing the initial search results and the keyword search results to the client machine for simultaneous presentation in a user interface of the client machine, the presentation comprising one or more tabbed pages, each tabbed page of the one or more tabbed pages including at least a portion of the initial search results, a linguistically transformed keyword of the one or more linguistically transformed keywords identified by the keyword provider, and at least a portion of the keyword search results corresponding to a search performed based on the linguistically transformed keyword of the one or more linguistically transformed keywords.

14. The non-transitory machine-readable medium of claim 13, wherein the operations further comprise, in response to receiving a selection of a tabbed page, displaying a respective portion of the keyword search results corresponding to a search performed based on a respective linguistically transformed keyword included in the tabbed page.

15. The non-transitory machine-readable medium of claim 13, wherein the one or more additional searches of the data repository based on the one or more linguistically transformed keywords are a title search or a body search.

16. The non-transitory machine-readable medium of claim 13, wherein the presentation comprises a display of the meta-keyword.

17. The non-transitory machine-readable medium of claim 13, wherein the operations further comprise collecting feedback about the one or more linguistically transformed keywords based on particular tabbed pages selected by the user.

* * * * *